United States Patent [19]
Miller

[11] 4,335,459
[45] Jun. 15, 1982

[54] SINGLE CHIP RANDOM ACCESS MEMORY WITH INCREASED YIELD AND RELIABILITY

[76] Inventor: Richard L. Miller, P.O. Box 489, Harvard Square Post Office, Cambridge, Mass. 02238

[21] Appl. No.: 151,690
[22] Filed: May 20, 1980
[51] Int. Cl.³ ............................................. G11C 29/00
[52] U.S. Cl. ...................................... 371/38; 365/200
[58] Field of Search ............................. 371/38, 21, 5; 324/73 R; 365/200

[56] References Cited

U.S. PATENT DOCUMENTS

| | | | |
|---|---|---|---|
| 3,681,757 | 8/1972 | Allen et al. | 371/21 |
| 3,735,105 | 5/1973 | Maley | 371/38 |
| 3,887,901 | 6/1975 | Moore | 340/146.1 |
| 3,898,443 | 8/1975 | Smith | 235/153 AM |
| 3,917,833 | 11/1975 | Scheuneman et al. | 235/153 AK |
| 3,949,208 | 4/1976 | Carter | 235/153 AM |
| 3,986,179 | 10/1976 | Elmer et al. | 340/173 |
| 4,005,405 | 1/1977 | West | 340/146.1 |
| 4,017,652 | 4/1977 | Tanahashi et al. | 340/146.1 |
| 4,024,386 | 5/1977 | Caudel et al. | 371/21 |
| 4,037,091 | 7/1977 | Beuscher | 235/153 AM |
| 4,038,648 | 7/1977 | Chesley | 371/21 |
| 4,077,028 | 2/1978 | Lui et al. | 340/146.1 |
| 4,145,757 | 3/1979 | Bonnie | 365/17 |
| 4,176,258 | 11/1979 | Jackson | 324/73 R |
| 4,205,301 | 5/1980 | Hisazawa | 371/3 |

OTHER PUBLICATIONS

Beaven, Error Correction on VLSI Memory Chips, IBM Technical Disclosure Bulletin, vol. 22, No. 8B, Jan. 1980, pp. 3833–3834.
Bossen et al., Measurement and Generation of Error Correcting Codes for Package Failures, IEEE Transactions on Computers, vol. C-27, No. 3, Mar. 1978, pp. 201–204.
"Error Correction Goes on First 16-Bit Memory Boards," Bursky, D., Electronic Design, 23, Nov. 8, 1978, p. 141.
"Special Report: Memories," Electronic Design, Sep. 27, 1980, p. 68.
"Memory Chips: Intel's Method," Schuyten, Peter J., The New York Times, Thursday, Dec. 4, 1980, p. D2.
"Applying the Hamming Code to Microprocessor-Based Systems," Wall, Ernst L., Electronics, Nov. 22, 1979, pp. 103–110.
"iSBC® Compatible Error Correcting RAM," brochure by Mupro Computer Products, MBC Memory Series.
"IBM Shows Off an Unusual New Family of Dynamic RAMs," Electronics, Nov. 9, 1978, pp. 39–40.
"A Review of the State of the Integration Art," den Brinker, C. S., Electronics & Power, Sep. 1978, pp. 657–660.
"Memory Makes Turn to Redundancy," Posa, John G., Electronics, Dec. 4, 1980, pp. 108–110.
"Attacks Mount on Alph Particles As RAM Densities Rise," Electronics Design, Nov. 22, 1980, pp. 36–37.
"64-K Dynamic RAM Needs Only One 5-Volt Supply to Outstrip 16-K Parts," Rao et al., Electronics, Sep. 28, 1978, pp. 109–116.
"Full Wafer MNOS Memory Rivals Bubbles in Space," Electronic Design, 23, Nov. 8, 1979.

Primary Examiner—Charles E. Atkinson
Attorney, Agent, or Firm—Hamilton, Brook, Smith and Reynolds

[57] ABSTRACT

The production yield and reliability of random access integrated circuit memory chips are greatly increased by providing a memory capacity greater than the nominal capacity of the chip and providing error correction circuitry on the chip. The internal organization of the memory chip must be on a multibit word basis to provide for storage of data and error correction bits. If the external organization of the chips is for input and output of fewer data bits than used by the error correction code, the data is read into the memory using a read-modify-write operation, and data is read out of the memory chip by reading a full word through the error correction circuit and selecting the output bits from the corrected word. In a multiple chip memory system each memory chip includes its own on-chip error correction. Additionally, conventional external error correction may be provided. The error correction may be incorporated into a single chip microprocessor in order to increase the yield and reliability of the microprocessor.

28 Claims, 8 Drawing Figures

SINGLE CHIP RANDOM ACCESS MEMORY WITH INCREASED YIELD AND RELIABILITY

DESCRIPTION

TECHNICAL FIELD

This invention relates to integrated circuit random access memories including both read-only and read/write memories.

BACKGROUND ART

In a random access integrated circuit memory chip, binary digits, or bits, are stored in semiconductor memory cells. Individual bits or words of several bits can be accessed at random by addressing selected memory cells or small groups of cells within the memory. The information stored in the addressed memory cells can then be read out. Where the information is relatively permanently stored in the memory cells, the memory is termed a read-only memory. Where, however, the information stored in the memory can be readily and selectively changed, the device is termed a read/write memory. The term random access is often used in a limited sense to apply to these read/write memories; however, the term is used here in its broader sense. It applies to the addressing mode of the device and thus includes such other devices as read-only memories and programmable read-only memories.

With the trend toward extremely miniaturized circuits having a minimum of interconnections, there has been a concomitant increase in the number of memory cells formed on a single minute chip of semiconductor crystal. Single chip integrated circuit memories having a memory capacity of over 64 kilobits (64 K, that is, 65,536 bits) of information are not uncommon. A major limitation on the increased capacity of memory chips is that, with the increase, the production yield decreases substantially. As the size of the memory chip increases, the number of chips which can be fabricated on each semiconductor wafer decreases, and the likelihood that a chip includes one or more defective memory cells or other circuitry increases.

In an effort to increase the yield of functional memory chips per semiconductor wafer, some manufacturers include extra memory cells on each chip. Then, during initial testing or subsequent periodic testing, defective cells can be detected, and those cells can be replaced with the extra cells. The replacement is by means of special addressing circuitry. Such redundant fabrication used with this fault-tolerant addressing offers substantially increased yield over conventional memory chip designs by bypassing hard errors noted in a memory chip during testing.

Another problem encountered in memory systems of all sizes is that a memory chip may be good when placed in a circuit but later suffer some error in its output. The error may be a temporary, "soft" error caused by radiation or the like, or it may be a permanent, "hard" error resulting from some defect in the memory which arises after testing. The avoidance of errors in the memory output is often of critical importance. For example, where a computer system controls a manufacturing process on a production line the presence of a single bit error in the memory output may result in a shutdown of the entire production line. Such shutdowns are costly and time consuming. Thus, it is desirable that the errors be corrected before the computer relies on the information which contains the errors.

In order to detect or even correct such errors which occur during use of a memory system, redundant bits are often added to a word of information bits. These bits are generated from the word of information bits and stored with them in the memory system. During readout, the encoded word, that is, all of the stored information and redundant bits, is accessed. Decoding circuitry can then detect errors and correct one or more errors depending on the degree of redundancy. For example, with the widely used Hamming code four parity bits can be added to an eight bit data word to provide for single bit error correction or five parity bits can be added to the eight bit data word to provide for single bit error correction and double bit error detection.

Such error correction is used primarily in large, multichip memory systems, and each encoded memory word is generally stored as one bit per memory chip. When those bits are then read out as a word, they can be decoded through an error correction circuit to provide the corrected information bits. With no more than one bit of any encoded word stored on any chip, failure of one memory chip can affect no more than one bit of an encoded memory word and, absent other errors, a correct output can be provided. For example, with the code mentioned above, one bit of each word may be stored in each of twelve memory chips. On read-out, the bits from the same address in the several chips are fed through error correction circuitry to provide an eight bit output.

The use of error correction circuitry in a memory system greatly increases the reliability of the system by correcting soft errors, and hard errors which arise after testing.

An object of the present invention is to provide a single chip, random access integrated circuit memory device with a high yield comparable to that of the fault-tolerant addressing system discussed above which also has greater reliability than has heretofore been possible.

DISCLOSURE OF THE INVENTION

In accordance with the invention, a single chip memory of a nominal capacity is fabricated with an excess of memory cells. The chip also includes error correction circuitry. The memory has the external appearance of a memory of the nominal capacity but, with use of internal error correction circuitry, the output is already error corrected. As a result, many of the hard errors which arise during fabrication of the chips can be corrected to increase the yield of functioning devices. Further, almost all soft errors and a substantial percentage of subsequently occurring hard errors are corrected, increasing the reliability of the device. Thus, the internal error correction circuitry provides both increased production yield and increased reliability of the memory chip.

If the number of bits in the output from a memory chip is less than the number of information bits in the chip's stored word, the corrected data can be held in a buffer register on the chip, and selected bits can be output from that register. If the device is a read/write device, information is written into memory through a read-modify-write operation to be described below.

In a multiple chip memory system, each memory chip has its own internal error correction. If desired, however, conventional external error detection and/or correction can be provided.

If, in a multiple chip memory system, a single bit is taken from each memory chip in a given bank of chips for each word, the nominal number of bits stored in each memory chip is equal to the total number of words stored in each bank of memory chips.

In a single chip microcomputer, the read-only memory, the read/write memory or both can be used in conjunction with on-chip error correction circuitry.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

PREFERRED MODE OF CARRYING OUT THE INVENTION

Figure 1:
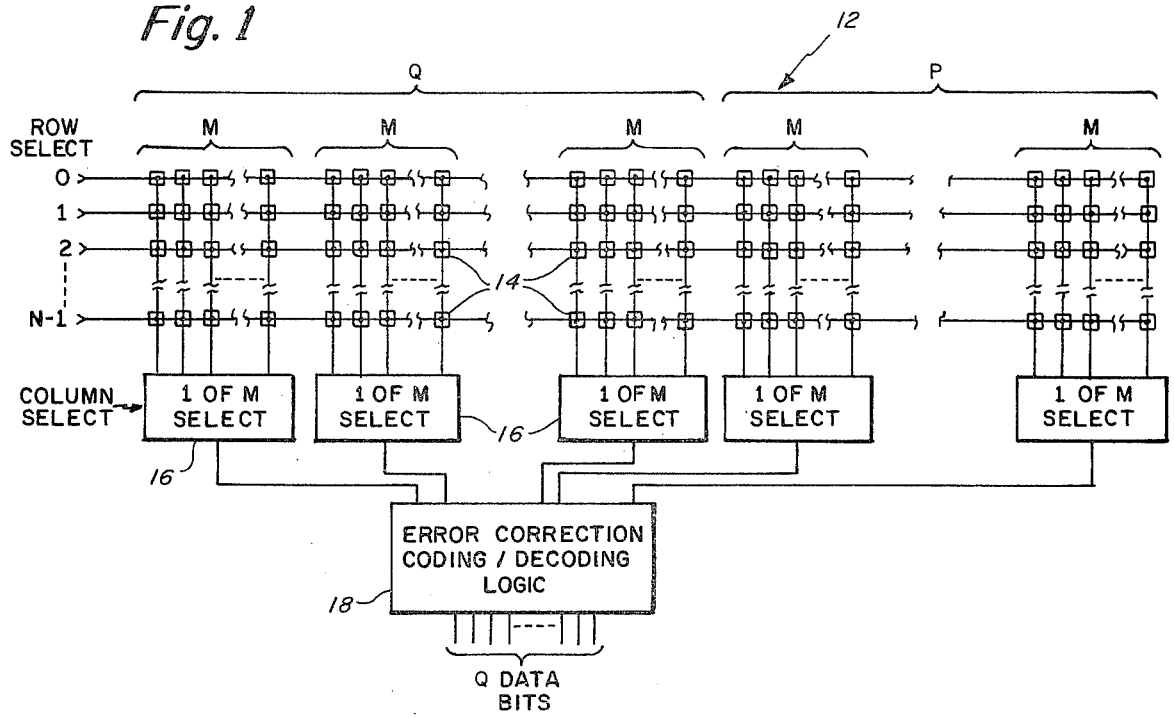
FIG. 1 illustrates a typical layout of memory cells in a memory array used in practicing the present invention.

A generalized memory device embodying this invention is shown in FIG. 1. That circuit can be best understood with reference to a particular memory chip. Assume, for example, that one wishes to fabricate a chip of nominal capacity 16 K bits and having a 2 K×8 input/output format. This indicates that there are 16,384 individual memory cells and the input and output to the chip is in 8-bit words. The memory array could be arranged with each word in a separate row. However, this would result in a very narrow array of 2,048 rows and Q=8 columns. Thus, in order to reduce the maximum dimension of the chip, the 2,048 words are further broken into M columns and N rows such that M×N=2,048. The result is a memory array as shown in the left portion of FIG. 1. There are N rows and Q groups of M columns, or Q×M columns, of memory cells for data storage.

In accordance with this invention the memory array 12 also includes additional storage capacity. For each Q-bit data word read into or out of the memory, a (P+Q)-bit code word is stored. The number P of redundant bits in each code word depends on the data word size, the particular error correction code used and the number of incorrect bits which are correctable or detectable. For example, using a Hamming code with the data stored as 8-bit words, an additional four parity bits are added to each word to provide for single bit error correction. The final array 12 for a 16 K memory chip might then include 256 rows, each row having 8×12 bits, where M=8, N=256, and P+Q=12. An additional parity bit can be added to each memory word to provide double bit error detection, if desired; in this case, the final array 12 for a 16 K memory chip might then include 256 rows, each row having 8×13 bits, where M=8, N=256 and P+Q=13.

The particular error correction code suggested for this application is the widely used Hamming code or one of the many modified Hamming codes. Such codes are termed block codes, as distinguished from tree codes, in that a code word can be determined from any data word, and the data word can be determined from any code word, without knowledge of any other words stored in memory. In the Hamming and modified Hamming codes the P+Q data and error correction bits in the code word include the Q bits derived from and generally equal to the Q bits of the data word, and P parity bits; however, not all block codes require that the integrity of the data word be maintained in the code word. It is necessary that redundant information be included in the code word; that is, the code word must include more bits than are in the data word. But the P+Q data and error correction bits in the code word may be completely distinct from the bits of the data word except through the encoding and decoding processes. The important thing is that the code word data and error correction bits carry the data and the error correction information, regardless of the arrangement of that information within the word.

Figure 2A:
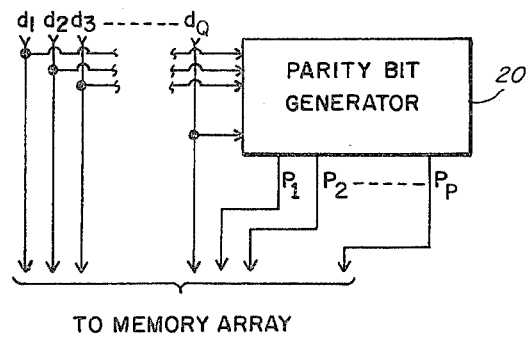
FIGS. 2A and 2B are block diagrams of an error correction code generator and a decoder to be used in conjunction with the memory array of FIG. 1.

Returning to the specific embodiment of a 16 K memory chip discussed above with respect to FIG. 1, when an 8-bit data word is to be stored in memory it is first directed through the error correction logic 18. FIG. 2A is a block diagram of the coding logic of circuit 18 for a Hamming code. The parity bit generator 20 of FIG. 2A generates P=4 parity bits. Twelve memory cells in one row are then addressed and the P+Q=12 data and parity bits are stored in those cells.

Figure 2B:
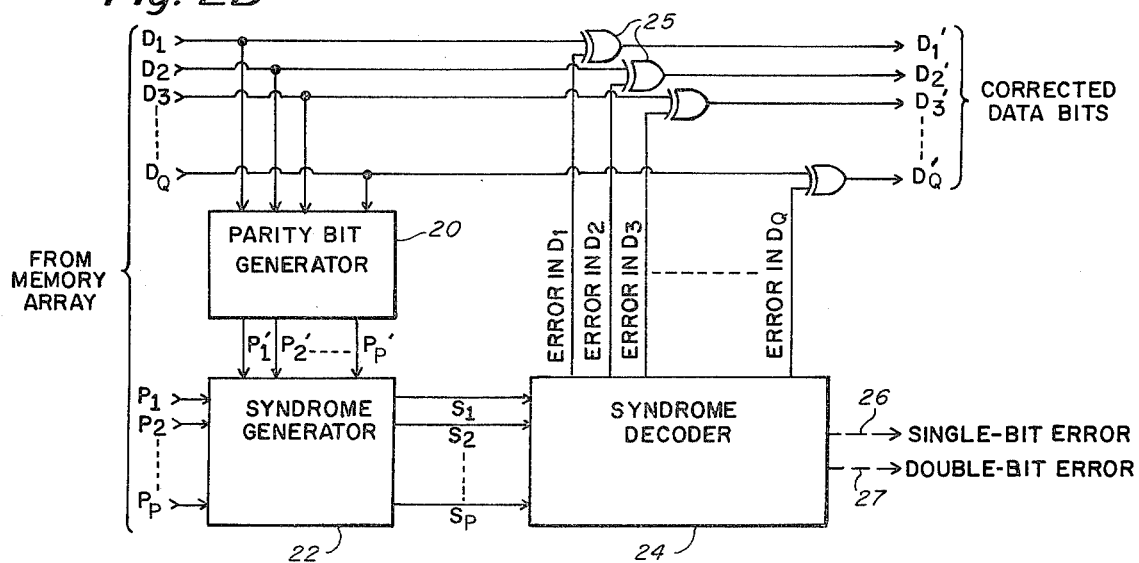

When an 8-bit word is to be read from the memory chip, the appropriate row and appropriate column in each grop of M columns are addressed. The 12 addressed memory cells are then read to provide a 12-bit code word to the error correction logic 18. There, the error correction decoding logic provides an 8 bit, error corrected data word. FIG. 2B is a block diagram of the decoding logic of circuit 18 for a Hamming code. The data bits taken from memory are first applied through the parity bit generator 20 and the resultant parity bits P' are applied to the syndrome generator 22 along with the parity bits P taken from memory. These bits are combined to produce P syndrome bits. The syndrome bits are decoded in decoder 24 to indicate which one, if any, of the Q data bits is incorrect if there is a single bit error. A bit is corrected by applying a signal to the appropriate one of the exclusive OR gates 25. If desired, a single-bit error indication can be provided on line 26. If a Hamming code of five parity bits per 8-bit memory word is used, a double bit error indication can be provided on line 27. A more complex error correction code using additional redundant bits would be required to correct double bit errors.

It should be noted that, rather than storing each word in P+Q groups of M columns, column decode circuitry could be provided to address P+Q adjacent cells in one of the M groups of columns. This latter arrangement is more susceptible to double bit errors, however, because a defect in a chip is more likely to affect two adjacent cells than two spaced cells. Using the internal storage format of FIG. 1, a defect in two adjacent cells affects two separate words. The resultant single bit error in each of these two words can be corrected by logic circuit 18.

Figure 3:
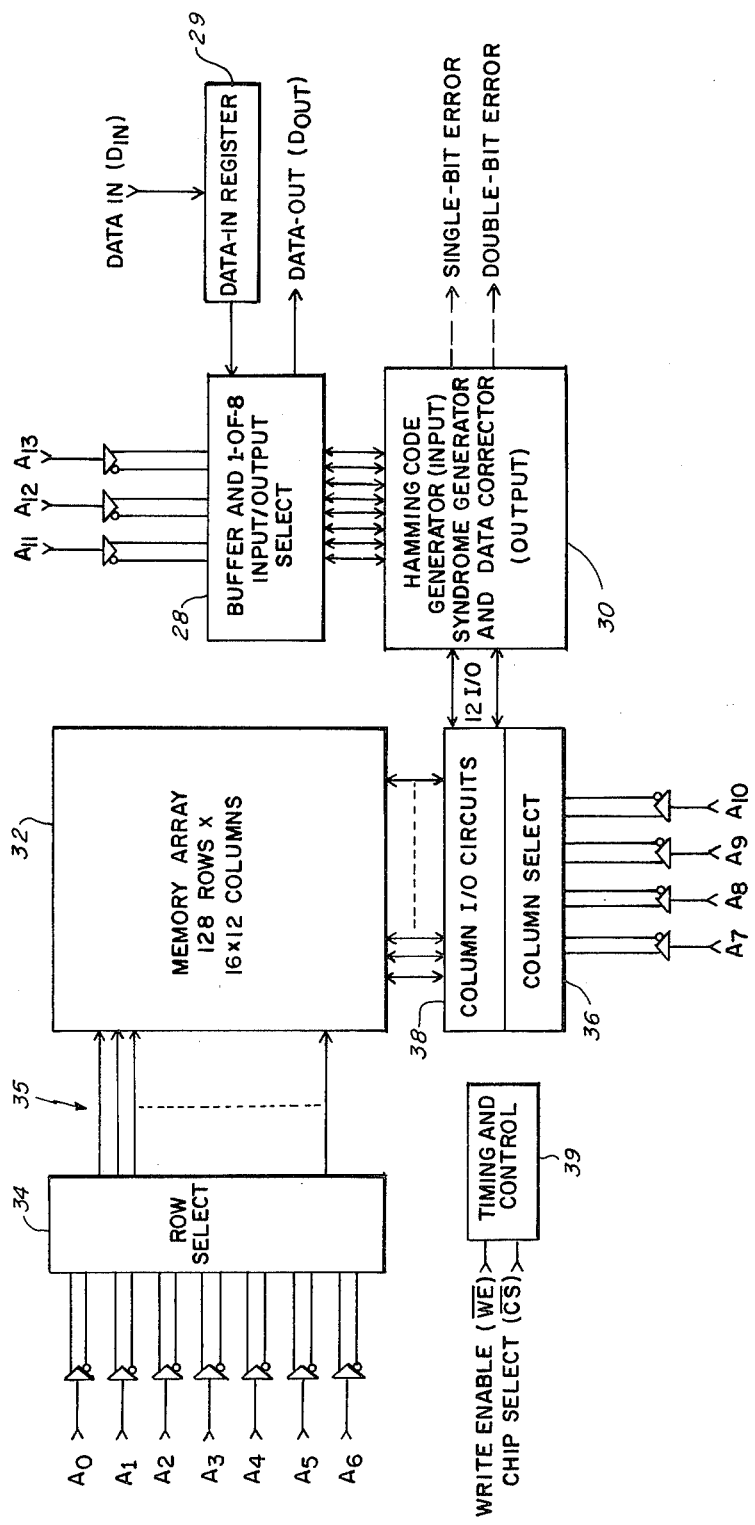
FIG. 3 is a block diagram of a 16 K×1 memory embodying the present invention.

An implementation of a 16 K by 1 random access memory is shown in FIG. 3. Although the input and output of the chip is a single bit rather than a multibit word, the internal format of the memory must be for multibit words in order to provide error correction resulting in increased yield for large capacity memory chips. In general, the data should be stored in words of P+Q bits, including redundant bits, even if the memory input/output is in single bits or in words of less than Q bits. As will be discussed below, Q should be at least four to provide for increased yield in a larger memory system. To that end, in this particular embodiment a buffer and one-of-eight selection circuit 28 is provided. When data is read out from the memory array, the Q error-corrected data bits, in this case eight bits, are held in the buffer and one of those bits is selected for the output by the addressing circuitry. When data is written into the memory, the single bit of input data is held in the register 29. The word in which the data input is to be stored is addressed and read through the error correction circuit 30 into the buffer. The word in the buffer is modified by the data input and that modified word is read back into the memory array through the error correction code generator. Thus, when the input/output format is for a number of bits less than is used for a data word in the selected error correction code, the system must write into memory using a read-modify-write operation. The lesser number need not be one. For example, the output might include four bits of the 8-bit error corrected word.

The memory array 32 of 128 rows and 16×12 columns and the 8-bit buffer 28 can be addressed using a 14-bit address word. The first seven bits of the address word are decoded in a row select circuit 34 to provide a signal on one of the 128 row select lines 35. The next four bits of the address word are decoded in the column select circuitry 36 to select 12 of the 192 sense amplifiers in the column circuits 38. The information from the thus addressed word of 12 memory cells is read into the Hamming code syndrome generator and data corrector of circuit 30 to provide an 8-bit, error-corrected output to the buffer 28. The final three bits of the address word are then used to select one of the eight bits in the buffer 28.

As already noted, the write operation includes the just-described read operation. Further, the input data which is held in register 29 is used to modify the selected bit of the eight bits in buffer 28. The modified word is then fed back through the Hamming code generator of circuit 30. The eight data bits plus the four generated parity bits are fed through the column input/output circuits to the addressed row in the memory array and are stored in the appropriate memory cells.

Figure 4:
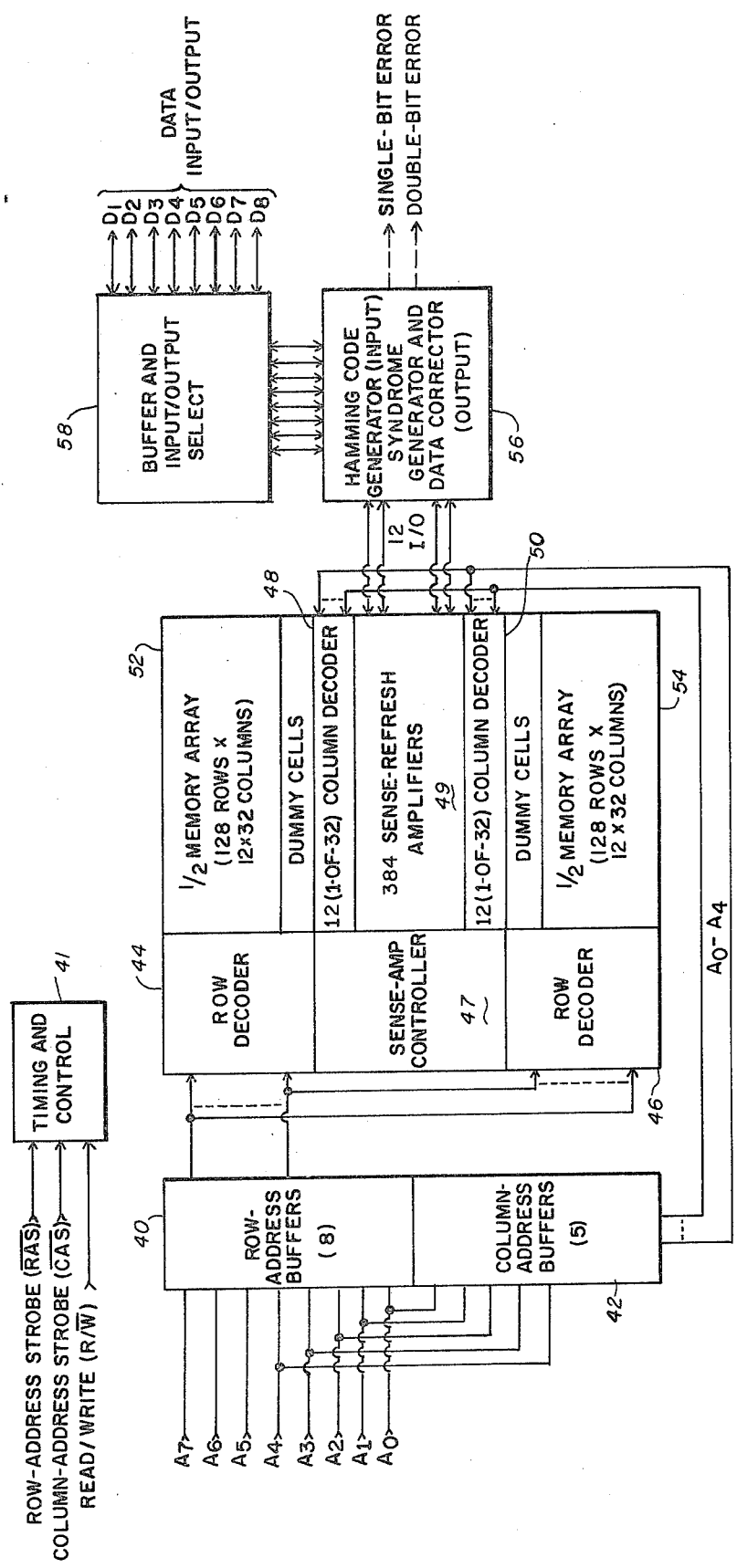
FIG. 4 is a block diagram of an 8 K×8 memory embodying the present invention.

A 64K memory chip embodying the present invention is shown in FIG. 4. Data is written into and read out of the memory chip as 8-bit words; the internal word length is chosen to be Q=8 bits, so it is not necessary to use a read-modify-write operation to write data into the memory. Because of the size of the memory array, a conventional practice of dividing the memory array into half arrays has been used. In that way, the sense amplifiers are positioned within half a column from each memory cell to reduce column line capacitance and thus reduce access time and power requirements. In fact, the memory array may be divided into any number of parts. To limit the number of addressing leads to the memory chip, the row and column address signals are multiplexed to buffers 40 and 42. The address signals stored in those buffers are decoded by row decoders 44 and 46 and column decoders 48 and 50 to address a 12-bit word stored in half memory arrays 52 and 54. During the read operation, a 12-bit code word of data and error correction bits is read from the memory array and fed into the error correction decoder 56 to provide a corrected 8-bit data word to the output buffer 58. During the write operation, an 8-bit data word is applied to the code generator 56 through buffer 58, and that word is used to generate four parity bits which are fed with the data bits to the memory array.

In each four-parity-bit embodiment thus far described, the chip can be made pin compatible with conventional chips having the same nominal capacity, that is the memory capacity exclusive of parity bit storage. The user of the chip need not even be aware of the chip's increased internal storage and the error correction circuitry. The power requirements for this chip will be somewhat higher than for the conventional chip, and the access time for read operations and cycle time for write operations will be somewhat greater; however, these disadvantages are offset by the increased yield and the increased reliability of the circuit, which will be discussed in detail below.

Increased reliability of these memory chips over conventional chips is apparent. Given an initially functional chip, soft or hard errors which arise will be corrected to provide an error-free output from the chip as long as critical areas of the chip remain defect-free and no code word has more than one incorrect bit. This is particularly advantageous with respect to hard errors since they would otherwise necessitate replacement or repair of the affected chip. With the present invention, a chip which develops a hard error in its non-critical area will probably remain fully functional. Further, if an additional parity bit per memory word is used, minimal circuitry is required to indicate when a double bit error occurs in the chip.

It should be recognized that this single chip error correction scheme is an improvement over the use of external error correction in terms of both cost and power requirements. To implement external error correction, separate error correction circuitry and additional memory capacity must be purchased at an additional cost. For example, if the Hamming code discussed above were to be used, a conventional 8-chip memory system would have to be expanded to 12 chips of the same nominal chip capacity to provide single bit error correction. The error correction of the present system is obtained using only eight memory chips and no external error correction circuitry. Further, as will be noted below, the cost of each memory chip can actually be reduced. As to power consumption, in most systems the power required by the additional memory chips needed for external error correction can be expected to exceed the power required by the several internal correction circuits.

Figure 5:
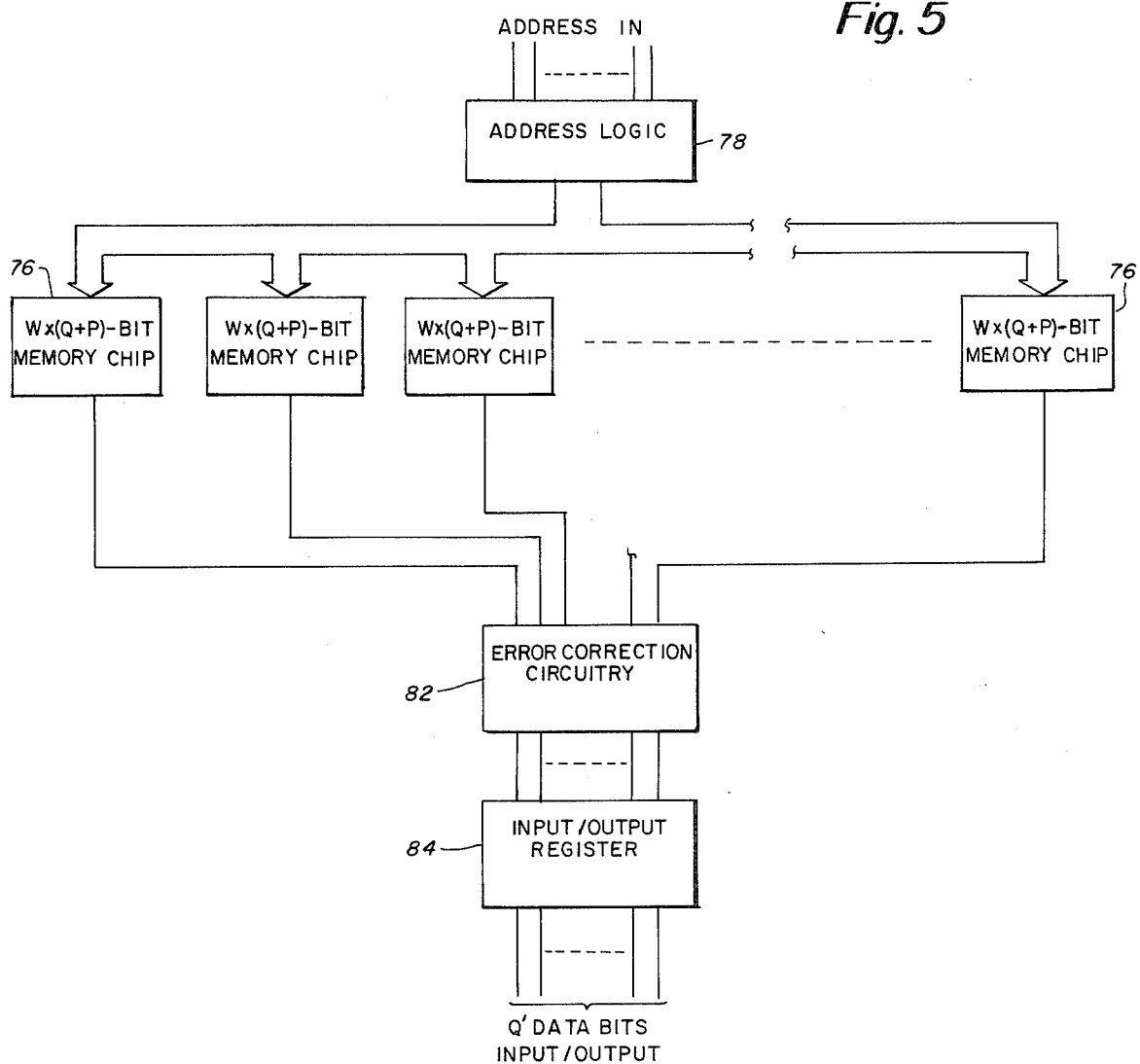
FIG. 5 is a block diagram of a multiple chip memory system, using chips embodying the present invention, along with external error correction.

As shown in FIG. 5 it is possible to use external error correction with chips embodying the present invention. In effect, this provides for multiple error correction using the same additional circuit elements previously required for single bit error correction.

In FIG. 5, a plurality of memory chips, each embodying the present invention, are addressed by address logic 78. One bit of information from the same address in each chip is then output. If there are R chips the R bit output could at this point be used as the output of the memory system. However, as noted above, error correction logic 82 can be provided. This external error correction provides a corrected data word of a reduced number of bits to the output register 84. For that error correction, redundant bits are stored in extra memory chips. As will be discussed later, such a system is substantially more reliable than a system using external error correction with conventional memory chips.

It should be apparent that to store V words of R bits in a bank of R single-bit output memory chips, each chip should have a nominal capacity of W×Q bits with W×Q equal to V, where W is the number of words in the internal organization of the chip and Q is the numer of data bits in each of those words. The actual capacity of each chip would of course be greater because each chip would also include the W×P parity bits.

Figure 6:
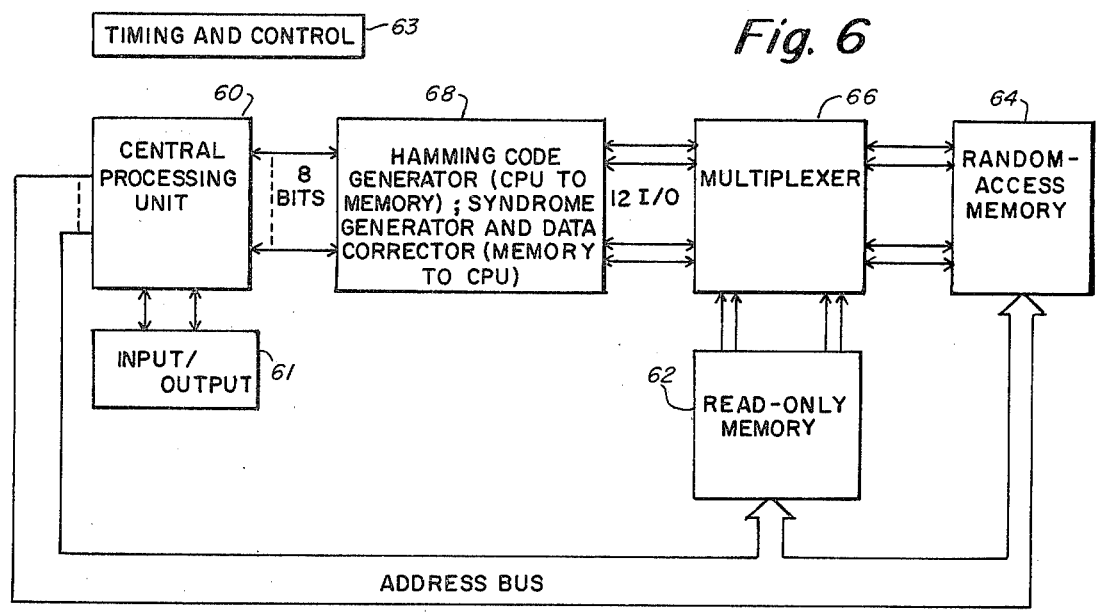
FIG. 6 is a block diagram of a single chip microcomputer embodying the present invention.

FIG. 6 illustrates a single chip microcomputer embodying the present invention. In the past only limited memory has been provided on the chip with the central processing unit, and generally most of the read/write memory has been on separate chips. This is because yield is a rapidly decreasing function of chip area; for example, if the processing unit and the read/write memory can each be manufactured with a yield of about 20% of the chips being functional, combining the two on a single chip reduces that yield to less than 4%. Thus, designers have preferred to select tested chips from separate fabrication processes and combine them in systems. As will be explained below, the present invention increases the yield of a single chip microcomputer to more accceptable levels. Further, increased reliability is obtained.

The single chip microcomputer of FIG. 6 includes a central processing unit 60 which addresses the read-only and read/write memories 62 and 64 of the system. The outputs from these memories and the inputs to them are multiplexed in multiplexer 66. The error correction encoder and decoder 68 is positioned between that multiplexer and the central processing unit.

The increased yield and reliability resulting from the use of error correction circuitry on a memory chip are demonstrated by the following analyses.

Figure 7:
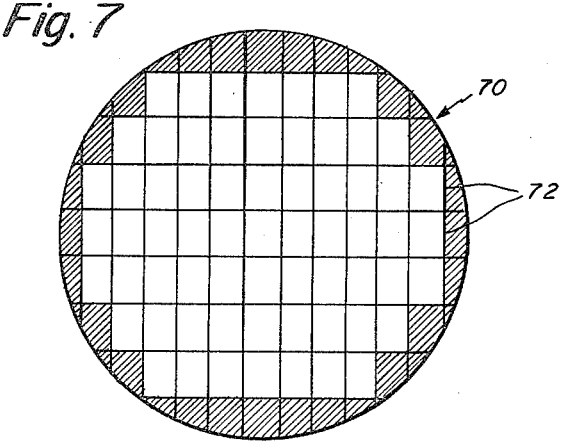
FIG. 7 is an illustration of the layout of memory chips as they are fabricated on a circular wafer.

Assume that a number of memory chips are formed on and cut from a circular wafer 70 as shown in FIG. 7. The wafer has a radius r and a surface area s and the average number of defects on the wafer after fabrication is N. As shown, the wafer is divided into a number of rectangular chips 72, each having an area A. Only complete chips can contribute to the yield from the wafer. Incomplete chips, designated by the shading in FIG. 7, contribute to waste from the wafer.

The number of functional chips which can be produced from a single wafer, that is, the yield from the wafer, is equal to the product of the number of complete chips on the wafer, functional or nonfunctional, and the probability that any given chip is functional.

The number of complete chips on the wafer can be estimated by assuming an effective wafer radius $r_{eff} = r - \sqrt{A}$. The effective radius can be used to provide a close approximation of the area covered by complete chips. Thus the number of complete chips is approximately equal to $$\frac{s_{eff}}{A} = \frac{\pi r_{eff}^2}{A} = \frac{\pi \left(r - \sqrt{A}\right)^2}{A} \quad (1)$$

To determine the probability that a given complete chip is functional one must first distinguish between critical and non-critical areas of a chip. On any chip there are areas in which defects do not affect the functioning of the chip. Such areas include unused areas and areas covered by large bonding pads and the like; they are here referred to as miscellaneous non-critical areas. Further, using the present invention, errors in certain areas of the chip can be corrected. Specifically, errors in the memory array and column circuitry can be corrected within the limitation of the error correction code, and these areas are termed correctable and non-critical. The row select and error correction circuitry are critical; that is, errors there affect the output of the chip and are not corrected, making the affected chip less then fully functional. With conventional memory chips, which include no error correction circuitry, the critical area of the chip is about 90% of the entire chip area.

Assuming a random distribution of defects in chips, and applying the Poisson distribution, the probability that there are no defects in a given area of a chip is $\exp(-X)$, where X is the expected average number of defects in the given area. Assuming that all errors in the non-critical area of a given chip can be corrected, the probability that the chip will be fully functional, that is without error in its output, is the same as the probability that it has no defects in its critical area. Thus, the probability that a chip is functional is $\exp(-C/D)$, where C is the critical area of each chip and D is the mean area per defect for the wafer, $D = s/N$.

From the above analysis, the average yield can be determined as follows:

$$\text{yield} = \begin{array}{c}\text{number of complete}\\ \text{chips per wafer}\end{array} \times \begin{array}{c}\text{probability that a given chip}\\ \text{has defect-free critical areas}\end{array} \quad (2)$$

$$= \frac{\pi \left(r - \sqrt{A}\right)^2}{A} \exp\left(\frac{-C}{D}\right)$$

For a wafer with a radius of 50 mm and for an average of 500 defects per wafer, D is equal to $5\pi$ mm². This leaves two variables which determine yield: the surface area of each chip, A, and that portion of the surface area, C, which is critical. By placing error correction circuitry on each memory chip, the critical area of each chip is reduced at a cost of increased total chip area. As can be seen by the yield formula of equation 2, while the yield is inversely related to both the total chip area and the critical area, that relationship is approximately linear with respect to total chip area, while it is exponential with respect to critical area. Thus, it is sometimes possible to increase yield by reducing the critical area of a chip even if there is a concomitant increase in the total chip area.

It should be recognized from the above that, even where the size of the critical area is reduced, the yield will not improve if the decrease in critical area is at a cost of too great an increase in the total area. For that reason, it is important that the memory chip have an internal organization of multibit data words. Data words of less than four bits require too many redundant bits in error correction to gain an increase in yield for learge capacity memories. For example, using the Hamming code a 4-bit data word requires three parity bits to form the code word, and an 8-bit data word requires four parity bits. Thus, if the chip has an internal organization of either four or eight bits per data word, the area of the memory array is increased by 7/4 or 12/8 over that of the conventional array. However, if a 1-bit or 2-bit data word were used, two or three parity bits would be required, respectively, and the increase in the size of the memory array would be by a factor of 3 or 5/2, respectively. Such a large increase in the chip area would actually reduce the production yield of large capacity memory chips.

The actual number of bits in each internal data word in the chip, likely to be 4 bits, 8 bits or 16 bits, is determined by several considerations. As the data word size increases, the ratio of redundant bits to data bits decreases so that the increase in the size of the memory array becomes smaller. On the other hand, with larger internal data words, the error correction circuitry becomes more complicated, and the size of that critical area increases.

The following analyses are provided to support a predicted 89% increase in production yield for the 16K×1 static read/write memory of FIG. 3, 69% and 50% increases for two versions of the 8K×8 dynamic read/write memory of FIG. 4, and 66% and 297% increases for two microprocessors, each as shown in FIG. 6.

In a conventional memory chip corresponding to the chip of FIG. 3, the error correction logic 30 would not be used. The non-critical and critical areas of the remaining sections of the chip of FIG. 3 could be as follows:

|  | Non-Critical | Critical |
|---|---|---|
| Memory array 32 |  | 26,000 |
| Column circuits 36, 38 |  | 1,000 |
| Buffer and 1-of-8 input/output select 28 | 500 |  |
| Other circuitry 29, 34, 39 |  | 8,500 |
| Miscellaneous non-critical area (bonding pads, unused area, etc.) | 4,000 |  |
|  | 4,000mil$^2$ | 36,000mil$^2$ |
| Total 40,000mil$^2$ |  |  |

For a 50 mm radius wafer having 500 defects, equation 2 indicates a yield of 56 chips with defect-free critical areas per wafer.

In converting the conventional 16K×1 memory chip in accordance with this invention, the capacity of the memory array must be increased to provide for storage of the redundant bits. Thus, assuming the use of a Hamming code, with 4 parity bits for each 8 data bits, the area of the memory array increases by a factor of 12/8. Similarly, the areas of the column select and column input/output circuits 36 and 38 increase by that factor. All single bit errors, that is, situations in which exactly one bit of an encoded word is incorrect, occurring in the memory array or the column circuits can be corrected by the error correction circuitry; thus, these areas are termed non-critical. Error correction circuitry 30, having an area of 1,600 mil$^2$, is added to the chip; this circuitry must be defect-free, so it is critical. The capcity of the memory array is increased by increasing the length of the rows and not the number of rows; thus, there is no increase in the area of the critical row select circuitry. Further, the timing and control circuit is substantially the same size as in the conventional memory. The results of the above changes to the circuit are summarized as follows:

|  | Non-Critical | Critical |
|---|---|---|
| Memory array 32 | 39,000 |  |
| Column circuits 36, 38 | 1,500 |  |
| Buffer and 1-of-8 input/output select 28 |  | 500 |
| Error correction circuitry 30 |  | 1,600 |
| Other circuitry 29, 34, 39 |  | 8,500 |
| Miscellaneous non-critical area | 5,700 |  |
|  | 46,200mil$^2$ | 10,600mil$^2$ |
| Total 56,800mil$^2$ |  |  |

It can be seen that, although the total area of the memory chip has been increased, its critical area has been greatly decreased. Based on these totals, equation 2 indicates a yield of 107 chips with defect-free critical area per wafer.

The yield formula is based on an assumption that all errors which occur in a non-critical area of a chip are corrected. By conventional statistical analysis of the embodiment described above it has been determined that there is a probability of 0.994 that one of these chips with defect-free critical area will successfully hide whatever defects it may have in its correctable area. That is, 99.4% of the chips with defect-free critical areas should be completely functional. That analysis was based on the assumption that a defect in the column select circuitry affects all bits in one column. Thus, with this embodiment one can expect a yield of 106 fully functional chips per wafer where error correction is included on the chip. This represents an 89% increase in yield over the corresponding conventional 16K×1 random access memory chip.

Yield indicates the number of chips which are considered functional when tested immediately after production. The accuracy and life of a functional chip after that initial test determines the reliability of the chip. A dual advantage of using error correction directly on the chip is that the initial yield of functional chips is increased and, further, the reliability of those functional chips is increased. The life of the chip is ended by the occurrence of a hard error in its critical area or uncorrectable hard errors in its non-critical area. One can expect the chip life to increase by a factor of about the inverse ratio of the effective critical areas, where the effective critical area is defined as the summation, over all areas of the chip, of area$_i$ times the probability that an additional defect in area$_i$ will make the chip nonfunctional. For example, the effective critical area of the chip just described is $(1.0\times10,600)+(1-0.996)\times39,000)+((1-0.906)\times1,500)+(0\times5,700)=10,900$ mil$^2$. Thus, for the 16K×1 read/write memory discussed above, the expected life increases by a factor of about 36,000/10,900 or 3.3. The mean time before failure due to hard errors which occur subsequent to initial testing is thus more than three times that of conventional circuits.

An analysis similar to that above can be made for the 8K×8 dynamic read/write memory of FIG. 4. Without error correction, the total area of the chip is 36,000 mil², broken down as follows:

|  | Non-Critical | Critical |
| --- | --- | --- |
| Memory array 52, 54 |  | 18,700 |
| Sense amps and column decoders 47, 48, 49, 50 |  | 5,500 |
| Row decoders 44, 46 |  | 1,500 |
| Other circuits 40, 41, 42, 58 |  | 6,800 |
| Miscellaneous non-critical area | 3,600 |  |
|  | 3,600mil² | 32,500mil² |
| Total | 36,100mil² |  |

Equation 2 indicates a yield of 72 chips with defect-free critical areas per wafer.

Similarly, the total area of the 8K×8 memory chip with single bit error correction is 51,350 mil², broken down as follows:

|  | Non-Critical | Critical |
| --- | --- | --- |
| Memory array 52, 54 | 28,050 |  |
| Sense amps and column decoders 47,48,49,50 | 8,250 |  |
| Row decoders 44, 46 |  | 1,500 |
| Error correction circuitry 56 |  | 1,600 |
| Other circuits 40,41,42,58 |  | 6,800 |
| Miscellaneous non-critical area | 5,150 |  |
|  | 41,450mil² | 9,900mil² |
| Total | 51,350mil² |  |

Equation 2 indicates a yield of 124 chips with defect-free critical areas per wafer. The probability that one of these chips will successfully hide whatever defects it may have in its correctable area is 0.9865; that is, 98.65% of the 124 chips with defect-free critical areas should be completely functional. The thus calculated yield of 122 fully functional chips per wafer provides an increase in production yield of 69%.

The probability that one of these fully functional chips will successfully hide an additional defect in its memory array is 0.990, and the probability that it will successfully hide an additional defect in its sense amps or column decoders is 0.954. Hence the effective critical area of this chip is 9,900+((1−0.990)×28,050)+ ((1−0.954)×8,250)=10,650 mil², and the expected increase in reliability with respect to hard errors is by a factor of about 32,500/10,650=3.05.

Similarly, the total area of the 8K×8 memory chip with single bit error correction and double bit error detection is 55,500 mil², broken down as follows:

|  | Non-Critical | Critical |
| --- | --- | --- |
| Memory array 52, 54 | 30,400 |  |
| Sense amps and column decoders 47, 48, 49, 50 | 8,950 |  |
| Row decoders 44, 46 |  | 1,500 |
| Error correction circuitry 56 |  | 2,000 |
| Other circuits 40, 41, 42, 58 |  | 7,100 |
| Miscellaneous non-critical area | 5,550 |  |
|  | 44,900mil² | 10,600mil² |
| Total | 55,500mil² |  |

Equation 2 indicates a yield of 110 chips with defect-free critical areas per wafer. The probability that one of these chips will successfully hide whatever defects it may have in its correctable area is 0.984; that is, 98.4% of the 110 chips with defect-free critical areas should be completely functional. The thus calculated yield of 108 functional chips per wafer provides an increase in production yield of 50%.

The probability that one of these fully functional chips will successfully hide an additional defect in its memory array is 0.989, and the probability that it will successfully hide an additional defect in its sense amps or column decoders is 0.950. Hence the effective critical of this chip is 10,600+((1−0.989)×30,400)+ ((1−0.950)×8,950)=11,400 mil², and the expected increase in reliability with respect to hard errors is by a factor of about 32,500/11,400=2.85.

Hard errors render a conventional chip non-functional; they render a chip with fault tolerant addressing non-functional unless it can be reconfigured so as to hide those errors. In addition, primarily in dynamic read/write memories, temporary, "soft" errors occur. Soft errors are random, non-recurring single bit errors. They can be induced by alpha radiation. For large capacity memory chips the soft error rate under normal conditions is on the order of one error per $10^6$ device hours of operation. The likelihood of this occasional soft error being successfully corrected by the dynamic RAM of FIG. 4 can be determined by conventional statistical analysis. The probability that a chip which is completely functional will successfully hide a soft error is 0.990 for the embodiment of FIG. 4 with single bit error detection. The soft error rate in a memory chip for this comparison is proportional to the number of memory cells on the chip. Only one soft error of every 100 will not be corrected by the chip's error correction circuitry for the embodiment of FIG. 4 with single bit error correction; one soft error of every 91 will not be corrected by the chip's error correction circuitry for the embodiment of FIG. 4 with single bit error correction and double bit error detection. Under conditions inducing an average of one soft error per unit of time in the conventional chip corresponding to FIG. 4, we expect an average of one soft error per Q/(P+Q) units of time (since there are (P+Q)/Q times as many memory cells) in the embodiments of FIG. 4. Hence, since most soft errors are internally corrected, we expect an average of one soft error per 100(8/12)=67 units of time to get through the error correction circuitry in the chip with single bit error correction; similarly, we expect to detect an average of one soft error per 91(8/13)=56 units of time in the chip with single bit error correction and double bit error detection. With conventional 64K dynamic RAMs, one can expect a soft error rate of about one soft error per $10^6$ device hours. By means of the present invention, the rate of soft errors at the chip output would be about one soft error per $6.7 \times 10^7$ device hours for the embodiment of FIG. 4 with single bit error correction, and one soft error per $5.6 \times 10^7$ device hours for the embodiment of FIG. 4 with single bit error correction and double bit error detection.

Note that the capacity for error correction after the initial test is a major advantage of the present approach to increasing yield. For example, in the fault-tolerant addressing systems in which redundant cells can be connected during an initial test or periodic maintenance checks to replace defective cells there is no ability to correct soft errors. Further, correction of hard errors requires subsequent testing of the chip; whereas with the present approach correction of those errors is automatic. Thus, this approach provides increased yield, as do fault-tolerant addressing systems, and in addition provides for increased reliability.

The increased reliability of memory chips incorporating the present invention has particular significance when those chips are used in a large memory system. For example, in a conventional 64K×16 memory using 64K memory chips, the memory system has an expected mean time between soft errors of 7.1 years and a predicted mean life, the average time period before failure due to uncorrectable hard errors, of about 70 years. If chips incorporating internal single bit error correction as per the present invention are used and those chips are periodically purged of soft errors by cycling through them to prevent the accumulation of double bit soft errors, the expected mean time between soft errors in the output of the memory system is 470 years. Also, the predicted mean life is more than 210 years.

A 16 megabyte memory system without error correction would require 2,048 64K chips. Using conventional chips, such a system would have a predicted mean time between soft errors of about 20 days and a predicted mean life of 200 days. By using 64K chips incorporating single bit error correction as per the present invention, the expected mean time between soft errors is 3.7 years. The system would have a predicted mean life of 1.67 years.

The system reliability discussed above makes the use of external error correction unnecessary in virtually all cases. Rather, even where exceptionally high reliability is required, it is generally sufficient to provide external single bit error detection, by using a single parity bit with each memory system word to indicate whether one of the chips has failed. Thus the 64K×16 memory system described above could be implemented using 17 64K chips rather than the 22 conventional 64K chips required in a memory system with external single bit error correction and double bit error detection.

Use of external error correction in a system utilizing memory chips embodying the present invention might be desirable where the memory system may be subject to "soft error events" in which a substantial number of soft errors occur in a short period of time. The high number of soft errors in such an event makes the possibility of double bit soft errors non-negligible. Such an event might be the result of a nuclear power plant accident, an atomic bomb explosion, or high radiation in an aerospace environment. A system which uses external error correction circuitry provides far greater resistance to radiation-induced memory system errors if constructed with memory chips which have internal error correction than if constructed with conventional memory chips.

Consider a random access computer memory system with 64K 16-bit words. Single bit error correction and double bit error detection may be implemented with a Hamming code, adding six bits of redundant information to each 16-bit data word. Twenty-two 64K×1 memory chips may be connected through external error correction circuitry to form the system.

Since the memory system under consideration is to have a high resistance to soft error events, when it is implemented with chips embodying the present invention the chips should have defect-free column circuitry; as will be noted below, such chips can be selected during chip testing. Each chip has an 8K×8 internal organization but has a buffer and 1-of-8 input/output select circuit to provide 64K×1 external organization.

The following table provides a summary of the probabilities that a memory system with external error correction, using conventional chips or chips with internal error correction, will survive a particular soft error event with no uncorrectable errors. The first column indicates the average number of soft errors which an event induces in each conventional memory chip. The second column indicates the number of errors induced by the same event in a corresponding chip with internal error correction. The third and fourth columns indicate the probabilities that the memory systems will survive a soft error event with no uncorrectable errors.

| Induced Soft Errors | | Probability of Surviving Intact | |
|---|---|---|---|
| Conventional | Internal Error Correction | Conventional | Internal Error Correction |
| 33.3 | 50 | .02 | .9991 |
| 66.7 | 100 | $2 \times 10^{-7}$ | .996 |

It can be seen from the above table that under the given conditions a conventional memory system would be expected to fail while there is still a high probability that the memory system using both internal and external error correction would be intact. The conventional system can be expected to survive a soft error event with 99% probability only if there is an average of no more than 1.7 soft errors per memory chip. In strong contrast, the memory system utilizing memory chips embodying the present invention has a 99% probability of surviving a soft error event inducing an average of 124 soft errors in each of the chips.

The statistical analysis of the reliability of chips incorporating this invention has been based on a recognition that initial correctable defects in the memory chip may occur in either the memory array or the column circuitry, that is the sense amps and column select circuits. A defect in the memory array affects a single bit; however, a defect in the column circuitry affects an entire column of bits, 128 or 256 bits in the embodiments of the invention given above. Thus, given one defect in the memory array, the chip is functional, but the one word containing that defect is intolerant of additional defects. On the other hand, given a single defect in the column circuitry, the chip is functional but as many words as there are bits in that column are intolerant of additional errors. It can then be seen that, although a chip may be functional despite having one or more defects in its memory array and column circuitry, a chip which has defect-free column circuitry is in general more reliable with respect to soft errors and future hard errors than a chip with one or more defects in its column circuitry. Thus, if chips are classified during initial testing as to whether they have column circuitry defects, only memory array defects, or no defects at all, the chips can be divided into classes of exceptionally high and high reliability. Specifically, of the dynamic read/write memory chips of FIG. 4 in the embodiment with single bit error correction, 22.5% of the chips which have defect-free critical areas also have defect-free correctable areas. Those chips therefore correct all words having single bit soft errors and are extremely reliable. 48.7% of the chips have defect-free column circuits and one or more defects in their memory arrays. Those chips also have exceptionally high soft error reliability of 0.999868; that is, they fail to correct only one of every 7550 soft errors.

The above groups of chips, 71.2% of all chips, are classified as having exceptionally high reliability. The remaining 28.8% of the chips have at least one defect in their column circuitry. Their soft error reliability factor is 0.966; that is, they fail to correct only one of every 29 soft errors. Note that even these less reliable chips are many times more reliable with respect to soft errors than are conventional memory chips; hence, they are classified as having high reliability.

The chips can be classified as to the location of defects by providing circuitry on the chip to indicate single bit errors. If during a test, a single bit error is noted in every word of some column of a nonetheless functional chip, that chip is classified with the less reliable chips, because it has a defective column. A disadvantage of providing such circuitry on the chip to indicate single bit errors is that it increases the area of the chip and thus reduces yield.

The chips can be classified without providing that single bit error indication circuitry. If one irradiates a chip with alpha radiation during the testing sequence, one can cause multiple soft errors. If the memory chip has no defects, most of those soft errors will be corrected by the error correction circuitry: only where two soft errors affect the same word will an error be noted in the output. Similarly, if the only defects are in the memory array a very high percentage of the soft errors are corrected. However, as noted above, if there is a defect in the column circuitry, a significantly lower percentage of the soft errors are corrected. For example, in the embodiment of FIG. 4 with single bit error correction (but without double bit error detection) the probability that a single soft error will be successfully corrected as 0.999868 if the chip has defect-free column circuitry and 0.966 otherwise. Thus, by exposing the chips to sufficient alpha radiation to induce a known expected number of soft errors, the chip can be classified on the basis of the number of errors noted at the output of the chip during the testing sequence. This non-destructive testing enables classification without the disadvantage of providing a single bit error detection output from the chip.

As an example of the above testing method, a chip may first be tested electronically in the conventional manner to determine whether errors arise anywhere in the memory array. If no errors are noted, the chip is considered good and is then tested for classification. To that end, the chip is exposed to radiation which induces an average of, for example, 100 internal soft errors in the chip. Then the chip is cycled through the test sequence again and the number or errors is noted.

During such a test of a 64K random access memory as in FIG. 4, one would expect an average of 1.11 bits to be incorrectly read out from the chip if it has defect-free column circuitry. On the other hand, if there is a defect in the column circuitry one would expect an average of 6.33 bits to be incorrectly read out from the chip. The test sequence with radiation exposure can be repeated n times, and one would expect the average number of errors through the n cycles to be 1.11 n or 6.33 n depending on whether or not the column circuitry is defect-free. Of course, these numbers are only the average number of defects one would expect, and the actual number of defects noted in a number of tests would be distributed above and below each of those average values. In fact, a few chips having defect-free column circuitry might have a large number of errors, causing those chips to be classified as having column circuitry which is not defect-free. Of worse consequence, a few chips having column circuitry which is not defect-free might have very few errors in the output and would thus be classified as having column circuitry which is defect-free.

Improper labeling of the chips can be reduced by increasing the number of test cycles, thus increasing the difference between the average number of errors, and be selecting a decision cutoff point which tends to label more chips as not-defect-free. For example, if one were to run three test cycles with radiation which induces an average of 100 internal soft errors in each cycle, a decision cutoff of $9\frac{1}{2}$ errors results in a 0.0036 probability that a chip will be mistakenly included in the defect-free category. In the same case, the probability of a chip being mistakenly classified in the not-defect-free category is 0.0055. This latter mistaken classification is not as significant as the first because the primary goal is to make certain that only high reliability chips are included in the defect-free classification. Including high reliability chips in the not-defect-free classification actually benefits the customers of chips classified in that manner. The chance of mistakenly including a chip in the defect-free group can be reduced to 0.000070 by reducing the decision cutoff point to $5\frac{1}{2}$. Of course, fewer chips of any batch would then be classified as exceptionally high reliability; in this case, lowering the cutoff from $9\frac{1}{2}$ to $1\frac{1}{2}$ reduces the number of chips classified as having defect-free column circuitry from 71% to 63%. 71.2% of the chips actually have defect-free column circuitry.

The above testing may be carried out before the wafer is cut into individual chips. Thus, the additional test only entails exposing each wafer to radiation and cycling each functional chip through a few additional test sequences.

Memory chips which embody the present invention do suffer from an increase in read access and write cycle times. If the internal and external data words are of the same length this increase can be made roughly 20%. As was noted above, where internal error correction is used in a memory chip having an input/output of a number of bits less than that required by the selected internal format, a read/write chip must operate internally in a read-modify-write mode. This results in an increase in memory write time of about 140%.

The effects of increases in access time can be minimized. For example, main frame memory systems usually include cache memories. These cache memories are very high speed memories which typically handle 90 to 99% of the memory accesses. But the bulk of the memory is in slower memory devices. Thus, if memory chips embodying the present invention were used in all but the cache memory, the roughly 20% increase in access time would be diluted because the high speed cache memory would handle all but one to ten percent of the accesses. Thus, the effective increase in access time for a memory system resulting from use of this invention would be no more than about 10% in the read mode or in the write mode with equal internal and external word lengths in the individual memory chips.

Another way to reduce the effect of increased access time in a chip is to interleave a number of banks of chips. The memory system could be arranged such that most memory accesses are to a series of different memory chips rather than to the same memory chip several times in a row. Since most memory accesses are sequential, this is easy to do. In a write operation, the write address and data could be held in a latch for as long as necessary for the chip to finish its operation, while the memory system goes on to the next operation. This latch could be placed on each memory chip, or elsewhere in the memory system. If the next operation would alter the latch before the write operation is done, for example by a read or write involving the same chip, it must be delayed by the memory system. These and many other techniques for minimizing the effects of memory chip timing are well-known to memory system designers.

A way to reduce the average read and write access and cycle times of a single memory chip is to provide circuitry on the chip which will perform a direct read or write operation if the input/output buffer already contains the needed data word from a previous read or write operation. This is particularly effective since a large proportion of memory accesses are to sequential memory locations. If the addressed bit or bits are in the chip's input/output buffer as the result of a preceeding memory operation, they can be read from the buffer rather than from the memory array, with a substantial decrease in the time required for both read and write operations.

The increased yield and reliability for two different microcomputers, each having the block diagram shown in FIG. 6, will now be shown. The first microcomputer has an 8K×8 read-only memory and a 256×8 read/write memory. The second microcomputer includes the same 8K×8 read-only memory but an increased capacity 8K×8 read/only memory.

The total area of the microcomputer with the smaller read/write memory and no error correction is 59,650 mil$^2$, broken down as follows:

|  | Non-Critical | Critical |
|---|---|---|
| Central processing unit, timing and control, input/output 60, 61, 62 |  | 23,500 |
| Multiplexer 66 |  | 250 |
| Read-only memory 62 |  |  |
| memory array |  | 16,400 |
| column circuits |  | 2,150 |
| other circuits |  | 8,200 |
| Read/write memory 64 |  | 3,200 |
| Miscellaneous non-critical area | 5,950 |  |
|  | 5,950mil$^2$ | 53,700mil$^2$ |
|  | Total 59,650mil$^2$ |  |

Equation 2 indicates a yield of 17.3 chips with defect-free critical areas per wafer.

The total area of the above microcomputer with internal single bit error correction is 74,050 mil$^2$, broken down as follows:

|  | Non-Critical | Critical |
|---|---|---|
| Central processing unit, timing and control, input/output 60, 61, 63 |  | 23,500 |
| Multiplexer 66 |  | 250 |
| Read-only memory 62 |  |  |
| memory array | 24,600 |  |
| column circuitry | 3,200 |  |
| other circuits |  | 8,200 |
| Read/write memory 64 | 3,700 | 1,600 |
| Error correction circuitry 68 |  | 1,600 |
| Miscellaneous non-critical area | 7,400 |  |
|  | 38,900mil$^2$ | 35,150mil$^2$ |
|  | Total 74,050mil$^2$ |  |

Equation 2 indicates a yield of 28.8 chips with defect-free critical areas per wafer. The read-only memory has 256 rows and 32 groups of (8+4) columns. By conventional statistical analysis it can be shown that the probability that the read-only memory will be fully functional if is has defect free critical area is 0.9957; it has an effective critical area of 8,400 mil$^2$. The read/write memory is arranged as a 256-row, (8+4)-column array, tacked on to the end of the read-only memory. It has memory array area of 875 mil$^2$ and column circuitry areas of 260 mil$^2$. By conventional statistical analysis it can be shown that the probability that the read/write memory is fully functional is 0.9996. Hence the probability that one of these chips will successfully hide whatever defects it may have in its correctable area is 0.9957×0.9996=0.995. Therefore the predicted yield is 28.7 fully functional chips per wafer, providing an increase in production yield of 66%.

The effective critical area of this chip is 35,400 mil$^2$; hence, the expected increase in reliability over the chip without error correction with respect to hard errors is by a factor of 53,700/35,400=1.5. The soft error rate for this chip is far below the hard error rate, and is therefore negligible.

Similarly, the total area of the microcomputer with the larger read/write memory and without error correction is 89,450 mil$^2$, broken down as follows:

|  | Non-Critical | Critical |
|---|---|---|
| Central processing unit, timing and control, input/output 60, 61, 63 |  | 23,500 |
| Multiplexer 66 |  | 250 |
| Read-only memory 62 |  |  |
| memory array |  | 16,400 |
| column circuits |  | 2,150 |
| other circuits |  | 8,200 |
| Read/write memory RAM 64 |  | 30,000 |
| Miscellaneous non-critical area | 8,950 |  |
|  | 8,950mil$^2$ | 80,500mil$^2$ |
|  | Total 89,450mil$^2$ |  |

Equation 2 indicates a yield of 3.6 chips with defect-free critical areas per wafer.

With error correction, the above microcomputer has a total of 114,440 mil$^2$, broken down as follows:

|  | Non-Critical | Critical |
|---|---|---|
| Central processing unit, timing and control, input/output 60, 61, 63 |  | 23,500 |
| Multiplexer 66 |  | 250 |
| Read-only memory 62 |  |  |
| memory array | 24,600 |  |
| column circuitry | 3,200 |  |
| other circuits |  | 8,200 |
| Read/write memory 64 | 36,300 | 5,600 |
| Error correction circuitry 68 |  | 1,600 |
| Miscellaneous non-critical area | 11,450 |  |
|  | 75,550mil$^2$ | 39,150mil$^2$ |
|  | Total 114,700mil$^2$ |  |

Equation 2 indicates a yield of 14.6 chips with defect-free critical areas per wafer. The read-only memory and the read/write memory are as previously described; the probabilities that these two memories are fully functional if their critical areas are defect-free are 0.9957 and 0.9865, respectively. Hence the probability that a chip with defect-free critical area is fully functional is $0.9957 \times 0.9865 = 0.982$. Therefore, the predicted yield is 14.3 fully functional chips per wafer, providing an increase in production yield of 297%.

The effective critical area of this chip is 40,000 mil$^2$, hence the expected increase in reliability over the chip without error correction with respect to hard errors is by a factor of about $80,500/40,000 = 2.0$. The soft error rate for this chip is the same as for the conventional read/write memory corresponding to FIG. 4; given one soft error per $10^6$ device hours for the conventional read/write memory corresponding to FIG. 4, only one soft error per $6.7 \times 10^7$ device hours, that is, 430 years, will not be corrected by the chip's error correction circuitry.

While this invention has been particularly shown and described with reference to preferred embodiments thereof, it will be understood by those skilled in the art that various changes in form and details may be made therein without departing from the spirit and scope of the invention as defined by the appended claims. For example, error correction codes other than Hamming codes may be used. One example is the Bose-Chauduri-Hocquenghem code.

I claim:

1. A random access integrated circuit memory device of a nominal capacity comprising, on a single semiconductor chip:

a memory array of capacity greater than the nominal capacity of the memory device;
   address decoding circuitry for selecting a code word of data and error correction bits from the memory array in accordance with an addressing input signal; and
   error correction decode logic circuitry for receiving the selected bits from the memory array and for generating corrected data bits less in number than the selected bits, the number of said corrected data bits and the error correction logic being such that the memory device demonstrates an increased theoretical yield over a like memory device having a memory array of capacity equal to said nominal capacity of the device.

2. A random access integrated circuit memory device of nominal (W×Q)-bit capacity comprising, on a single semiconductor chip:

a memory array for storing W words, each word having P+Q data and error correction bits;
   address decoding circuitry for selecting a code word of P+Q bits from the memory array in accordance with an addressing input signal; and
   error correction decode logic circuitry for receiving the selected P+Q bits from the memory array and for generating Q corrected data bits from the P+Q received bits, the number Q of corrected data bits and the error correction logic being such that the memory device demonstrates an increased theoretical yield over a like memory device having a memory array of capacity equal to said nominal capacity of the device.

3. A large scale integrated circuitry microprocessor comprising, on a single semiconductor chip:

a central processor for executing programmed instructions;
   at least one memory array of a nominal capacitry addressable by the central processor;
   error correction logic circuitry for receiving P+Q bits from at least said one memory array in response to an addressing signal provided by the processor and for providing an output of Q corrected bits to the processor, the number Q of corrected bits and the error correction logic being such that the microprocessor demonstrates an increased theoretical yield over a like microprocessor having a memory array of capacity equal to said nominal capacity.

4. A random access integrated circuit memory device of a nominal capacity comprising, on a single semiconductor chip:

a memory array of capacity greater than the nominal capacity of the memory device;
   address decoding circuitry for selecting a code word of data and error correction bits from the memory array in accordance with an addressing input signal; and
   error correction decode logic circuitry for receiving the selected bits from the memory array and for generating corrected data bits less in number than the selected bits.

5. A random access integrated circuit memory device of nominal (W×Q)-bit capacity comprising, on a single semiconductor chip:

a memory array for storing W words, each word having P+Q data and error correction bits;
   address decoding circuitry for selecting a code word of P+Q bits from the memory array in accordance with an addressing input signal; and
   error correction decode logic circuitry for receiving the selected P+Q bits from the memory array and for generating Q corrected data bits from the P+Q received bits.

6. An integrated circuit memory device as claimed in claim 4 or 2 further comprising, on the same semi-conductor chip, a buffer register for holding the Q correct data bits.

7. An integrated circuit memory device as claimed in claim 5 further comprising, on the same semiconductor chip, n-of-Q select logic circuitry for selecting and providing an output of n of the Q corrected data bits from the buffer register in accordance with the addressing input signal.

8. An integrated circuit memory device as claimed in claim 7 wherein n equals one.

9. An integrated circuit memory device as claimed in claim 7 wherein the device is a read/write memory and further comprises, on the same semiconductor chip, error correction encoding logic circuitry for generating a P+Q-bit code word from a decoded Q-bit word modified by the n-bit input in a read-modify-write operation.

10. An integrated circuit memory device as claimed in claim 4 or 2 wherein the device is a read/write memory and further comprises, on the same semiconductor chip, error correction encoding logic circuitry for generating a (P+Q)-bit word from a Q-bit word.

11. An integrated circuit memory device as claimed in claim 4 or 2 wherein the error correction decode logic circuitry is a block code decoder.

12. An integrated circuit memory device as claimed in claim 11 wherein the block code decoder is a Hamming code or modified Hamming code decoder.

13. A multiple chip random access memory system comprising a plurality of memory chips, each memory chip including:
    a memory array for storing W words of P+Q data and error correction bits; and
    error correction decode logic circuitry for generating Q corrected data bits from each word of P+Q data and error correction bits.

14. A multiple chip memory system as claimed in claim 13 wherein each memory chip further comprises a buffer register for holding the Q corrected data bits.

15. A multiple chip memory system as claimed in claim 14 wherein each memory chip further comprises n-of-Q select logic circuitry for selecting and providing an output of n of the Q corrected data bits from the buffer register.

16. A multiple chip memory system as claimed in claim 15 wherein n equals one.

17. A multiple chip memory system as claimed in claim 15 wherein each memory chip is a read/write memory device and further comprises, on the same semiconductor chip, error correction encoding logic circuitry for generating a (P+Q)-bit word from a decoded Q-bit word modified by the n-bit input in a read-modify-write operation.

18. A multiple chip memory system as claimed in claim 13 wherein the system is a read/write memory system and each memory chip further comprises error correction encoding logic circuitry for generating a (P+Q)-bit word from a Q-bit word.

19. A multiple chip memory system as claimed in claim 13 or 18 further comprising additional error correction logic circuitry separate from each of the memory chips for further correcting corrected bits from the memory chips.

20. A multiple chip random access memory system for storing V words of R bits in R memory chips, each memory chip comprising:
    a memory array for storing W words of P+Q data and error correction bits where W×Q is at least equal to V;
    error correction decode logic circuitry for generating Q corrected data bits from a word of P+Q data and error correction bits; and
    one-of-Q select logic circuitry for selecting and providing an output of one of the Q corrected data bits from the error correction decode logic circuitry.

21. A multiple chip memory system as claimed in claim 20 wherein the system is a read/write memory system and each memory chip further comprises error correction encoding logic circuitry for generating a word of P+Q data and error correction bits from a Q-bit word.

22. A multiple chip memory system as claimed in claim 20 or 21 further comprising additional error correction logic circuitry separate from each of the R memory chips for correcting combined data from the R memory chips.

23. A large scale integrated circuitry microprocessor comprising, on a single semiconductor chip,
    a central processor for executing programmed instructions;
    at least one memory array addressable by the central processor;
    error correction logic circuitry for receiving P+Q bits from at least one memory array in response to an addressing signal provided by the processor and for providing an output of Q corrected bits to the processor.

24. A large scale integrated circuit microprocessor as claimed in claim 23 or 3 wherein at least one memory array is a read-only memory for storing words of P+Q data and error correction bits.

25. A large scale integrated circuit microprocessor as claimed in claim 23 or 3 wherein at least one memory array is a read/write memory, the microprocessor further comprising, on the same chip, error correction encoding logic circuitry for generating a (P+Q)-bit word from a Q-bit word.

26. In a multiple chip memory system including memory chips used in parallel, the improvement comprising:
    in each of a plurality of the chips, actual memory capacity greater than the nominal capacity of the chip; and
    error correction logic circuitry incorporated into each of the plurality of chips, the number of bits per internal data word and the error correction logic being such that the memory chips demonstrate an increased theoretical yield over like memory chips, each having an actual memory capacity equal to said nominal capacity of the chip.

27. A method of classifying a memory chip having error correction circuitry thereon comprising:
    subjecting the memory chip to radiation to induce internal soft errors in the chip;
    electronically testing the chip to determine the number of errors in the chip which are not corrected by the error correction circuitry; and
    classifying the memory chip in accordance with the number of uncorrected errors.

28. A method of classifying a memory chip as claimed in claim 27 wherein the chip is tested before being cut from a multichip wafer.

* * * * *